(12) United States Patent
Stoila et al.

(10) Patent No.: US 10,821,691 B2
(45) Date of Patent: Nov. 3, 2020

(54) CORRUGATED TIRE BLADDER

(71) Applicant: The Goodyear Tire & Rubber Company, Akron, OH (US)

(72) Inventors: George Michael Stoila, Tallmadge, OH (US); Michael James Hogan, Tallmadge, OH (US); Minwu Yao, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/444,044

(22) Filed: Jun. 18, 2019

(65) Prior Publication Data

US 2020/0198270 A1 Jun. 25, 2020

Related U.S. Application Data

(60) Provisional application No. 62/781,816, filed on Dec. 19, 2018.

(51) Int. Cl.
*B29D 30/06* (2006.01)
(52) U.S. Cl.
CPC .. *B29D 30/0654* (2013.01); *B29D 2030/0655* (2013.01)
(58) Field of Classification Search
CPC ........ B29D 30/0654; B29D 2030/0655; B29D 2030/0659
USPC ..................................................... 425/43, 52
See application file for complete search history.

(56) References Cited

U.S. PATENT DOCUMENTS

| | | | | |
|---|---|---|---|---|
| 1,404,959 A | * | 1/1922 | Huetter .............. | B29D 30/0601 425/27 |
| 2,730,763 A | * | 1/1956 | Brundage .......... | B29D 30/0645 425/33 |
| 3,506,514 A | * | 4/1970 | D'Avello et al. .. | B29D 30/0654 156/132 |
| 3,640,653 A | * | 2/1972 | Laenen .............. | B29D 30/0603 425/33 |
| 3,963,394 A | * | 6/1976 | Shichman ............. | B29D 30/26 425/51 |
| 4,293,293 A | * | 10/1981 | MacMillan ........... | B29C 43/104 425/17 |
| 4,776,781 A | * | 10/1988 | Sakai .................... | B29C 43/104 425/48 |
| 4,872,822 A | * | 10/1989 | Pizzorno ................ | B29D 30/06 425/48 |
| 5,062,781 A | | 11/1991 | Szyms et al. | |

(Continued)

FOREIGN PATENT DOCUMENTS

| | | |
|---|---|---|
| JP | 7-232331 * | 9/1995 |
| JP | 2010000723 A | 1/2010 |

(Continued)

OTHER PUBLICATIONS

European Search Report for Serial No. EP19218327 dated Apr. 29, 2020.

*Primary Examiner* — James P Mackey
(74) *Attorney, Agent, or Firm* — June E. Rickey

(57) ABSTRACT

An expandable bladder for shaping a pneumatic tire to be mounted inside a tire curing mold, the expandable bladder having a toroidal configuration and having a pair of opposing annular beads, wherein the bladder has an expansion section that is formed from a plurality of waves.

4 Claims, 3 Drawing Sheets

(56) References Cited

U.S. PATENT DOCUMENTS

| | | | |
|---|---|---|---|
| 7,128,545 B2* | 10/2006 | Wang | B29C 43/3642 |
| | | | 425/52 |
| 7,144,236 B2 | 12/2006 | Wang et al. | |
| 7,404,712 B2* | 7/2008 | Szyms | B29C 45/4407 |
| | | | 425/437 |
| 2008/0105360 A1* | 5/2008 | Stoila | B29D 30/0645 |
| | | | 156/135 |
| 2009/0159215 A1* | 6/2009 | Agostini | B29C 33/505 |
| | | | 156/421.6 |
| 2014/0147539 A1* | 5/2014 | Jeannoutot | B29D 30/0601 |
| | | | 425/52 |

FOREIGN PATENT DOCUMENTS

| | | |
|---|---|---|
| JP | 2015074148 A | 4/2015 |
| SU | 1685727 A1 | 10/1991 |
| WO | 2012053537 A1 | 4/2012 |

\* cited by examiner

CORRUGATED TIRE BLADDER

FIELD OF THE INVENTION

The present invention is directed towards a tire curing bladder. More specifically, the present invention is directed towards a curing bladder used in the tire curing press, wherein the bladder gauge is optimized uniformed contact pressure of bladder to sidewall of tire and for improved fit of bladder into shoulder of tire, while providing reasonable and customary bladder life and curing.

BACKGROUND OF THE INVENTION

Conventionally, pneumatic rubber vehicle tires are produced by molding and curing a green (uncured) partially shaped tire in a molding press. A tire curing bladder presses the green tire radially outwardly against the mold outer surface by means of expansion gasses. By this method, the green tire is shaped against the outer mold surface that defines the tire tread pattern and configuration of the sidewalls. By application of heat and pressure, the tire is molded and cured at elevated temperatures.

In general practice, the expansion of the bladder is accomplished by application of internal pressure to the inner bladder cavity which is provided by a fluid such as a gas, hot water and/or steam which also may participate in the transfer of heat for the curing or vulcanization of the tire. The tire after molding and curing is allowed to cool somewhat in the mold, sometimes aided by adding cold or cooler water supplied to the bladder. Then the mold is opened, the bladder is collapsed, including release of its internal fluid pressure, and the tire is removed from the tire mold. Such use of tire curing bladders is well known to those having skill in the art.

One issue with conventional curing bladders is that they need to apply the correct amount of force and support in the tire shoulder area, particularly for high performance tires which require much larger local bladder stretch and high contact pressure between the bladder and the tire in the shoulder area.

Prior art bladders often do not fit into the tire shoulder area very well and cannot deliver the needed local high radial stretch and high enough contact pressure resulting in bladder related issues and defects, such as uneven tire gauge, trapped air and liner cracking. In addition, for ultra high performance tires that have low aspect ratios and large tire section width, bladders can contact the tire crown area at very low inflation pressures. This contact generates a large friction force which prevents the bladder from being further stretched in the radial direction.

Thus, it is desired to have an improved bladder that overcomes these deficiencies.

SUMMARY OF THE INVENTION

The invention provides in a first aspect of the invention an expandable bladder for shaping a pneumatic tire to be mounted inside a tire curing mold, the expandable bladder having a toroidal configuration and having a pair of opposing annular beads, wherein the bladder has an expansion section that if formed from a plurality of waves.

DEFINITIONS

"Aspect ratio" of the tire means the ratio of its section height (SH) to its segment width (SW) multiplied by 100 percent for expression as a percentage.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in segment for receipt of an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape with adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE PRESENT INVENTION

Figure 1:
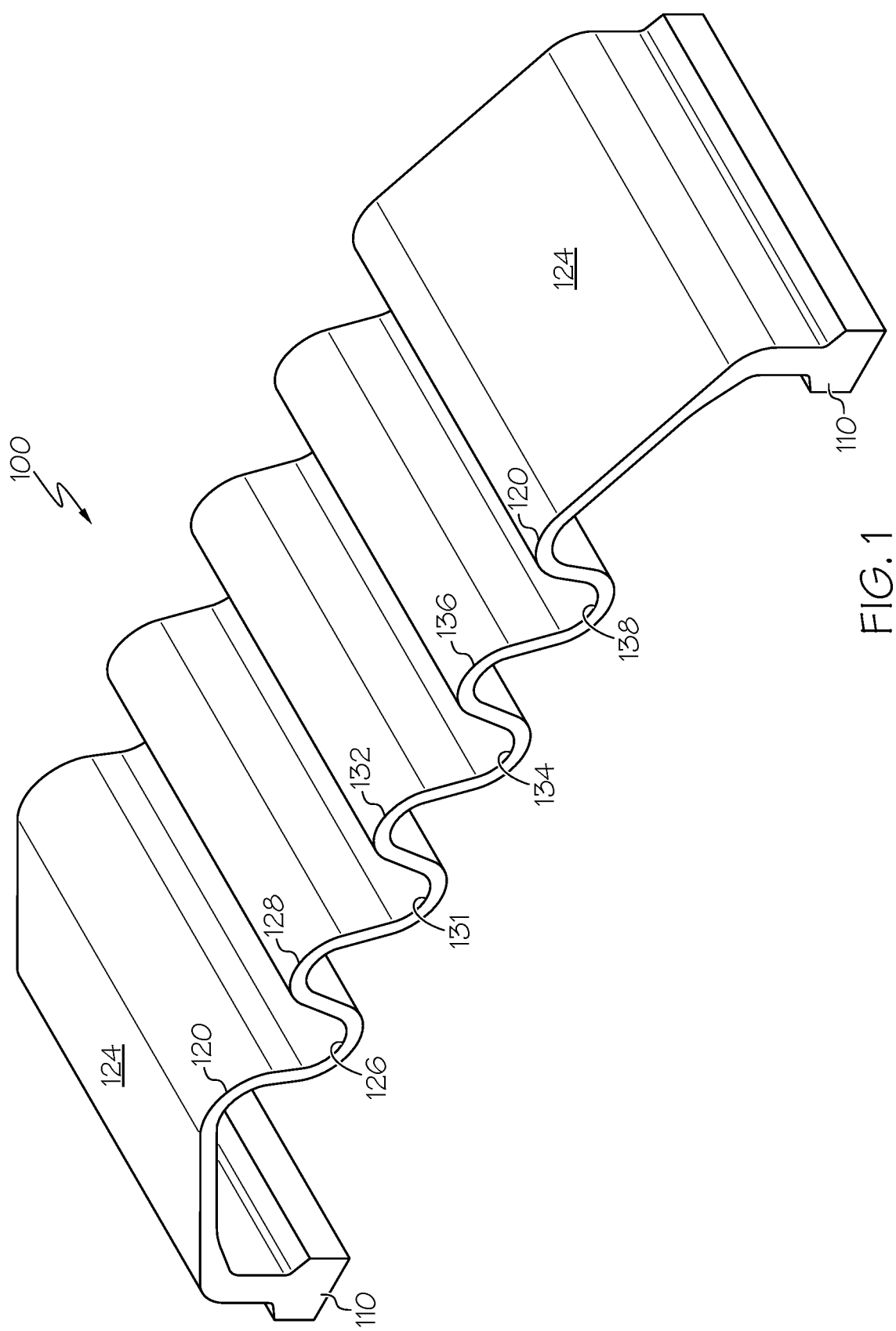
FIG. 1 is a perspective view of a tire curing bladder of the present invention.
Figure 2:
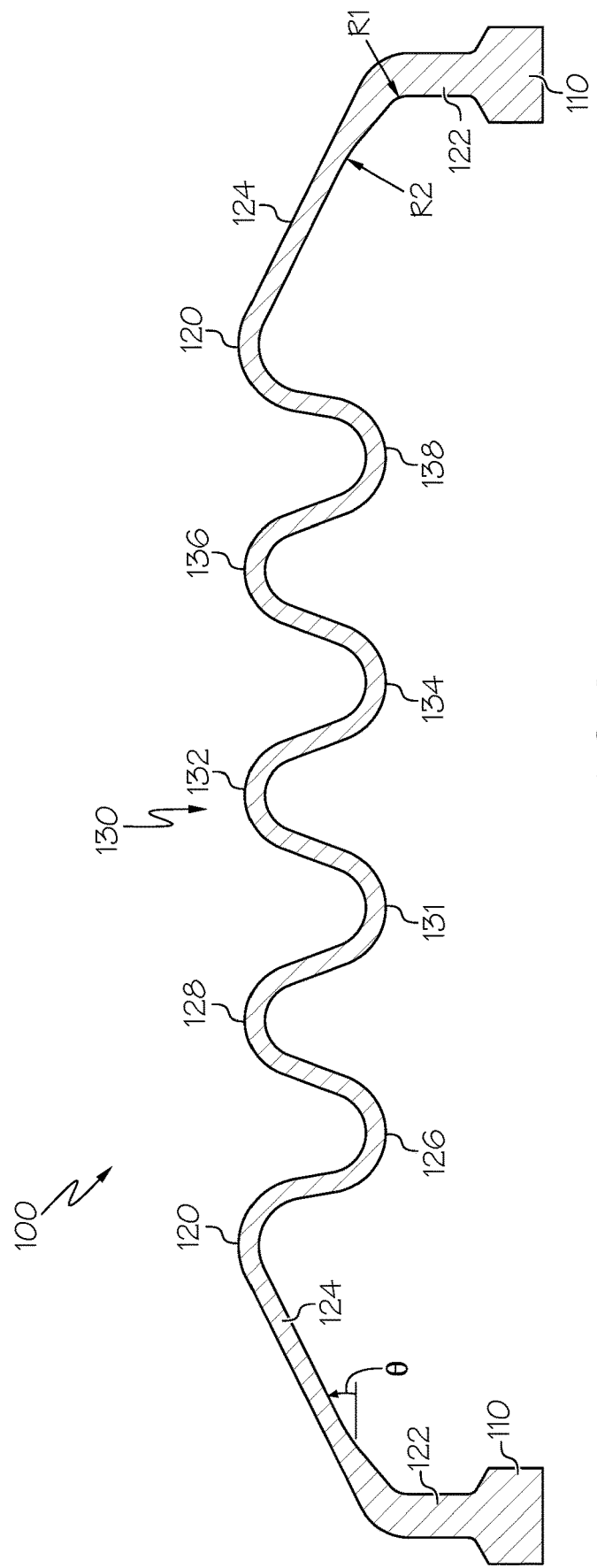
FIG. 2 is a side cross-sectional view of the tire curing bladder of FIG. 1.
Figure 3:
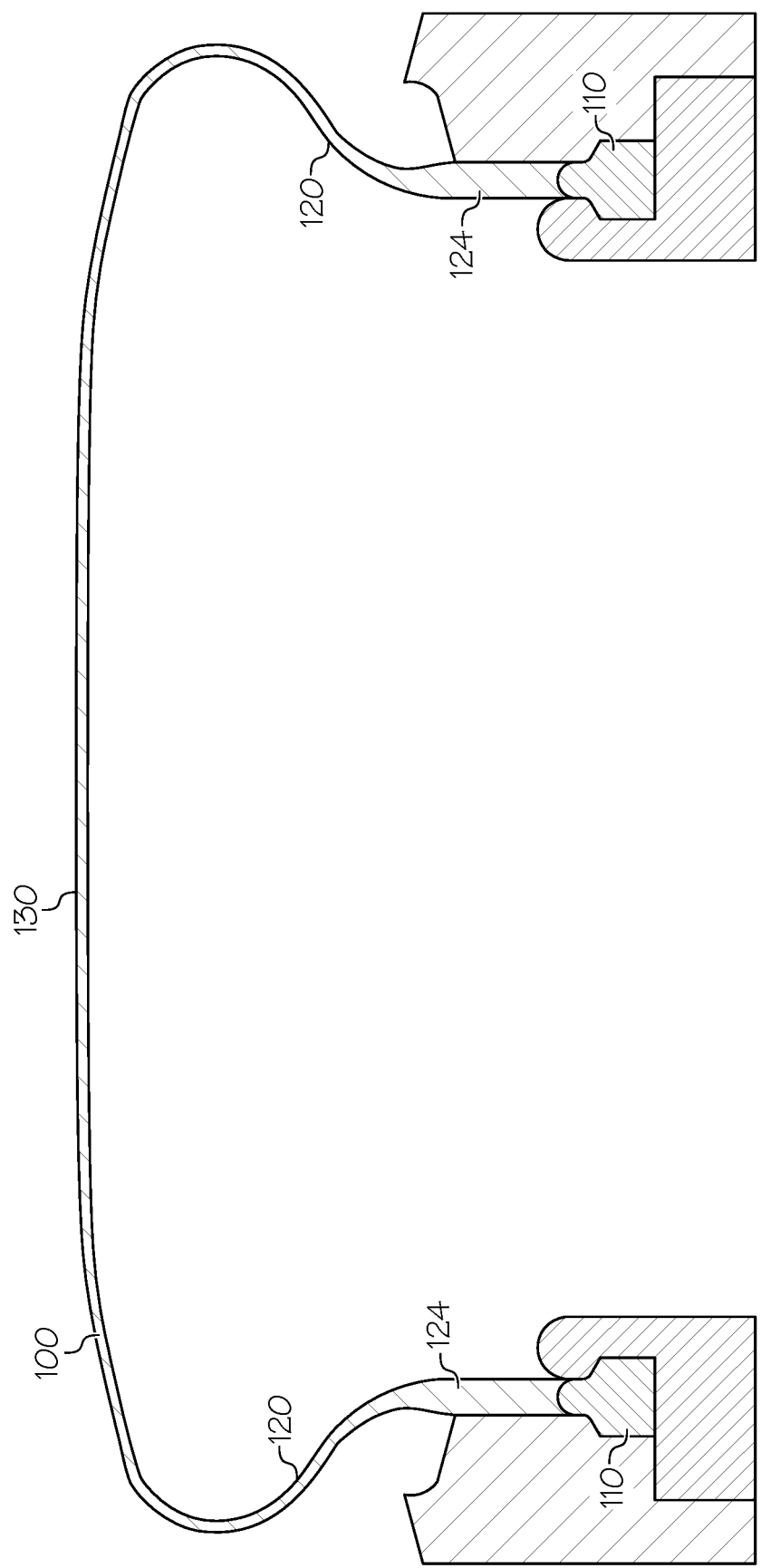
FIG. 3 is a schematic view of a tire building drum shown with the inner liner, chafer and toeguard applied.

FIG. 1 illustrates a tire curing bladder 100 of the present invention. The illustrated profile of the bladder is that of the bladder as formed, and not mounted in the tire curing mold. The tire curing bladder 100 has a pair of annular retaining beads 110 for securing the bladder to the tire curing press, as shown in FIG. 3. Each annular retaining bead 100 has a radially outer portion 122, and an angled portion 124 that extends between the radially outer portion 122 and a shoulder 120. The angled portion 124 is angled in the range of between 15 and 70 degrees, and more preferably between 25 to 50 degrees. As the bladder is inflated with shaping pressure, the angled portions 124 function to lever the bladder to the tire sidewall and shoulder during cure, exactly placing the bladder shoulder radius into the tire shoulder radius and to exert a lower surface contact pressure along the sidewall length than prior art bladders. Further the lever action also minimizes the force of the bladder on the bead area, keeping the force reaction on the metal mold ring parts, and promoting bead placement retention, especially for cable beads and eliminating cord shadowing from bead heel region into the sidewall regions.

Located between the shoulders 120 is a waved portion 130 formed of a plurality of waves or alternating U-shaped structures similar to a sine wave 126,128,131,132,134,136, 138. The wave forms can also be adjusted to align with ribs in the tread pattern, by adjusting the contact pressure thru the wave forms to the tire mold at the ribs, corrections and control of belt angle variation at the ribs can be compensated for. Each wave has a radius in the range of 10-60 mm and, more preferably, in the range of 10-30 mm. The bladder portion 130 between the shoulders 120 is not flat. The bladder 100 preferably has a constant cross-sectional thickness from the first shoulder to the second shoulder 120. The bladder cross-sectional thickness is preferably in the range of 3-7 mm, and more particularly 4-5 mm.

FIG. 3 illustrates the bladder 100 installed in a tire mold, wherein the tire curing bladder has expanded into the tire to closely match the shape of the tire to be cured. The corrugated center portion of the bladder has expanded and stretched to fill the tire. The bladder, due to the molded height and corrugated shape, requires very little stretching and very small amounts of vacuum for bladder removal from the cured tire. The bladder due to the molded height and corrugated shape requires very little stretching to insert the bladder into the tire for curing. Cycle time for shaping is reduced a significant amount as the bladder fits exactly into the green tire inner geometry, where as shaping hold and shaping deflate/reflate cycles were embodied into other bladder insertion cycles for non-optimum and non-full supporting bladders. The bladder, after very few cycles, develops a permanent set when inflated at 69 mbar and exactly matches the green tire inner contour. While still having memory of the molded waves, the bladder then slightly stretched and slightly vacuumed can recover the molded shape for insertion to green tire and removal from cured tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. An expandable bladder for shaping a pneumatic tire to be mounted inside a tire curing mold, the expandable bladder having a toroidal configuration and having a pair of opposing annular beads, wherein each annular bead has a straight section extending radially outward of each annular bead, and wherein each straight section is joined to an angled portion angled in the range of about 20-70 degrees, and wherein each angled portion is joined to a shoulder portion, and wherein an expansion section is formed between the shoulder portions, and wherein the expansion section is formed from a plurality of alternating U shaped waves joined together which extend in a continuous manner from one shoulder portion to the other shoulder portion, and wherein the expansion section between the shoulder portions is not flat.

2. The bladder of claim 1 wherein each wave has a radius in the range of 10-60 mm.

3. The bladder of claim 1 wherein the angled portion is angled at an angle θ in the range of about 25-50 degrees.

4. The bladder of claim 1 wherein the expansion section has a constant thickness.

* * * * *